United States Patent [19]
Weeden, Jr.

[11] 3,764,977
[45] Oct. 9, 1973

[54] SOLID-STATE MODEM CONTROL

[75] Inventor: Otto P. Weeden, Jr., Phoenix, Ariz.

[73] Assignee: Honeywell Information Systems Inc., Waltham, Mass.

[22] Filed: Nov. 24, 1972

[21] Appl. No.: 309,400

[52] U.S. Cl. ................ 340/147 R, 340/151, 328/75
[51] Int. Cl. ...... G06f 3/05, G06f 7/00, H03k 17/00
[58] Field of Search ........................ 340/147 R, 151; 178/58, 61; 328/75

[56] References Cited

UNITED STATES PATENTS 3,541,513 11/1970 Paterson ............................ 340/151
3,325,741 6/1967 Arya ................................ 328/75 X

*Primary Examiner*—Donald J. Yusko
*Attorney*—Lloyd B. Guernsey et al.

[57] ABSTRACT

A plurality of solid-state one-shots, logic gates and JK flip-flops are used to provide a compact modem control having improved reliability of operation. The solid-state logic circuits improve the accuracy of the timing over modem controls using relays.

9 Claims, 9 Drawing Figures

ANSWER MODE

ORIGINATE MODE

LONG SPACE

DIAL OPERATION,
ORIGINATE MODE

SOLID-STATE MODEM CONTROL

BACKGROUND OF THE INVENTION

The present invention pertains to solid-state modem controls and more particularly to a modem control using a plurality of solid-state one-shots, logic gates and JK flip-flops to provide a compact modem control having improved reliability of operation.

Electronic data processing has rapidly become a necessary adjunct to everyday business and provides not only means for calculating, accounting and general data processing, but also provides a source of business management information. To incorporate a data processing system into a business frequently requires a transmission for entry into the system over long distances. Terminal devices convert data from human readable form into binary form, and transmit this data over wires or microwave relay systems from the terminal device to the data processor. The data processor operates upon the data received and sends a return message to the terminal device. The data processor operates at a speed which is many times as fast as the operating speed of the terminal devices. To provide efficient use of the data communications equipment a control module such as a data terminal interface is connected between the terminal devices and the data processor. The data is transmitted a bit at a time from the terminal devices to the interface which temporarily stores the data and then sends the data to the processor.

The terminal devices convert data from human readable form into binary ones and binary zeros where binary ones and zeros are represented by two different voltage levels. A first modem or data set converts these different voltage levels to different audio frequencies or tones and uses these different tones to transmit data over wires or micro relay systems to a second modem near the data processor. The second modem converts the different tones into different voltage levels and delivers the data through an interface to the data processor. Other data from the processor is returned through the interface to the second modem which converts the difference in voltage levels into different tones which are transmitted over wires or micro relay systems to the first modem. The first modem converts the tones into different voltage levels for use by the terminal devices.

The interface converts monopolar signals from the computer into industry standard bipolar signals which are required to operate the modem. The interface also converts bipolar signals from the modem into monopolar signals which are required by the computer. Prior art modems use a plurality of relays to connect or disconnect the interface to the telephone lines, to provide timing of signals, to switch filters into and out of the circuit and to develop control signals. Such relays are slow and the relay contacts are relatively unreliable because of dirt and corrosion. The unreliability of the contacts and variations in the speed of opening and closing the contacts cause the timing to be erratic. This erratic timing may cause errors to be introduced into the data being transmitted between the data processor and the terminal devices. Also relays are relatively bulky and expensive. The present invention alleviates the disadvantages of the prior art modems by providing a solid-state modem control which uses a plurality of one-shots, logic gates and JK flip-flops to connect or disconnect the interface to the telephone lines, to provide timing of signals and to develop control signals. Such solid-state logic circuits are compact and less expensive to construct and maintain than the relays which are used in the prior art modems.

It is, therefore, an object of this invention to provide a new and improved modem control.

Another object of this invention is to provide a compact modem control.

A further object of this invention is to provide a modem control having improved reliability.

Still another object of this invention is to provide a modem control using semiconductors to replace relays.

Another object of this invention is to provide a modem control which is less expensive.

SUMMARY OF THE INVENTION

The foregoing objects are achieved in accordance with one embodiment of the present invention by employing a plurality of solid-state one-shots, logic gates and JK flip-flops to provide a compact modem control having improved reliability of operation. Accuracy of the timing is improved over the modem controls using relays.

Other objects and advantages of this invention will become apparent from the following description when taken in connection with the accompanying drawings.

DESCRIPTION OF THE PREFERRED EMBODIMENT

Since the present invention pertains to data processing and to data communication techniques, a description thereof can become very complex; however, it is believed unnecessary to describe all of the details of the data communication system to completely describe the present invention. Therefore, most of the details that are relatively well known in the art will be omitted from this description. Even though details will be eliminated a basic description of the entire system will be given to enable one skilled in the art to understand the environment in which the present invention is placed. Accordingly, reference is made to FIG. 1 showing a simplified block diagram of a data communication system which uses the present invention.

Figure 1:
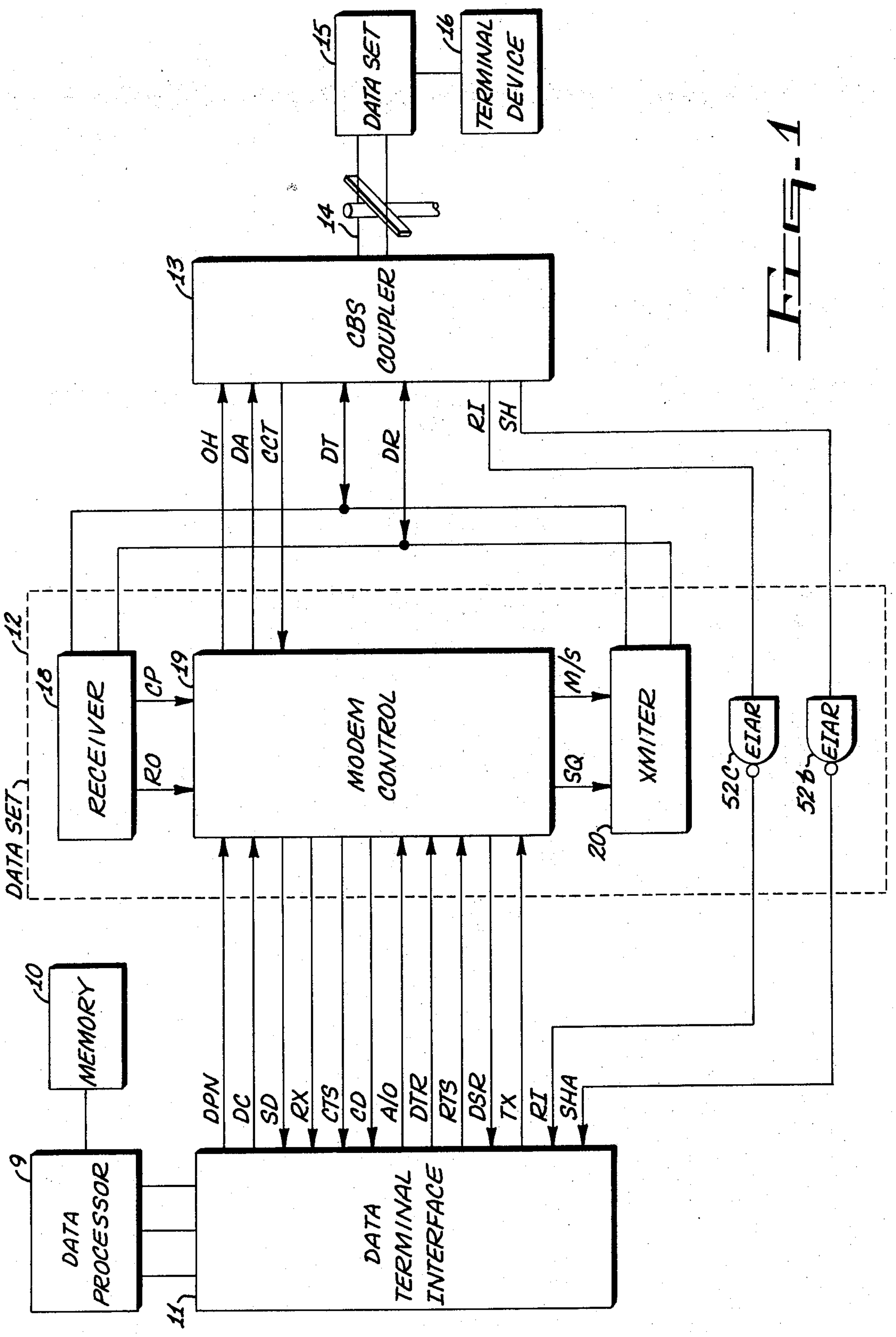
FIG. 1 is a simplified block diagram of a data communication system in which the present invention may be used.

The data communication system shown in FIG. 1 includes a data processor 9, a memory 20, a data terminal interface 11, a first data set or modem 12, a CBS coupler 13, telephone lines 14, a second data set 15 and a terminal device 16. The data processor shown in FIG. 1 manipulates data in accordance with instructions of a program which may be stored in the memory. The data processor receives an instruction, decodes the instruction and performs the operation indicated thereby. The operation is performed upon data received by the data processor and temporarily stored thereby during the operation. The series of instructions is called a program and includes decodable operations to be performed by the processor. The instructions of the program are obtained sequentially by the processor and together with the data to be operated upon, are stored in the memory. The memory 10 shown in FIG. 1 may be any of several well-known types; however, most commonly the main memory is a random access coincident current type having a plurality of discreet adjustable locations each of which provides storage for a word. The word may form data or instructions and may contain specific fields useful in a variety of operations. Normally, when the computer is in need of data or instructions, it will generate a memory cycle and provide an address to the memory. The data or words stored at the address location will subsequently be retrieved from memory 10 and provided to the processor 9.

A series of instructions comprising a program is usually "loaded" into the memory at the beginning of the operation and thus occupies a "block" of memory which normally must not be disturbed until the program has been completed. Data to be operated upon by the computer in accordance with instructions of the stored program is stored in memory and is retrieved and replaced in accordance with binary coded instructions.

Communications with the data processing system usually takes place through the media of input/output devices such as magnetic tape handlers, paper tape readers, punch card readers, and remote terminal devices. To control the receipt of information to and from such devices, an input/output control means is required. Thus an input/output controller or data terminal interface is provided and connects the data processing system to a variety of input/output devices. The data terminal interface coordinates the information flow to and from the various input/output devices and also awards priority when more than one input/output device is attempting to communicate with the data processing system. Since input/output devices are usually electromechanical in nature and necessarily have operating speeds which are much lower than the remainder of the data processing system, the data terminal interface provides buffering or temporary storage to enable the processing system to proceed at its normal rate without waiting for the time consuming communication with the input/output device.

Binary information which may be supplied from the memory is changed to the proper voltage level by the interface 11 and is converted by the data set 12 into modulated information which may be sent through the CBS coupler over telephone lines 14 to the second data set 15. The second data set converts the modulated information into binary information for use with the terminal device 16. Binary information which is generated by the terminal device 16 is converted by the data set 15 into modulated information which is sent over the telephone lines to the CBS coupler and data set 12. Data set 12 converts the modulated information into binary information again for use by the processor 9. The data sets 12 and 15 may either receive modulated information and convert the modulated information into binary information or they may receive binary information and convert it into modulated information.

For a complete description of the processor of FIG. 1 reference is made to U.S. Pat. No. 3,413,613 by Bahrs et al. Memory 10 may be one of the types disclosed in U.S. Pat. No. 3,521,240 issued to David L. Bahrs, John F. Couleur and Albert J. Beard. A more complete description of the operation of a data communication system is disclosed in a U.S. Pat. No. 3,618,031 issued to James A. Kennedy, Aldis Klavins and Robert J. Koegel, entitled "Data Communication System." A complete description of the data terminal interface 11 is disclosed in a copending application by John L. Hunter et al. entitled "Method and Apparatus for Communicating Devices each Performing Preprocessing OPerations on Data Autonomously of the Central Processor," bearing Ser. No. 108,284 and filed on Jan. 21, 1971. The CBS coupler 13 provides dc isolation between the telephone lines and the data set 12. A typical CBS coupler is the Bell Telephone model DAA 1001A and is described in the booklet "Data Couplers CBS and CBT for Automatic Terminals," 1970, American Telephone & Telegraph Company. The receiver 15 in the data set 12 receives audio signals from the CBS coupler and converts them into binary ones and binary zeros. For example an audio frequency of 1200 hertz may be converted to a binary zero. The transmitter 20 receives binary ones and binary zeros from the interface and converts them into audio frequency signals. Details of the operation of the transmitter 20 are disclosed in a copending application by David A. Bird entitled "Low Frequency Oscillator Circuit," bearing Ser. No. 267,828 and filed on Feb. 18, 1972.

Figure 2A:
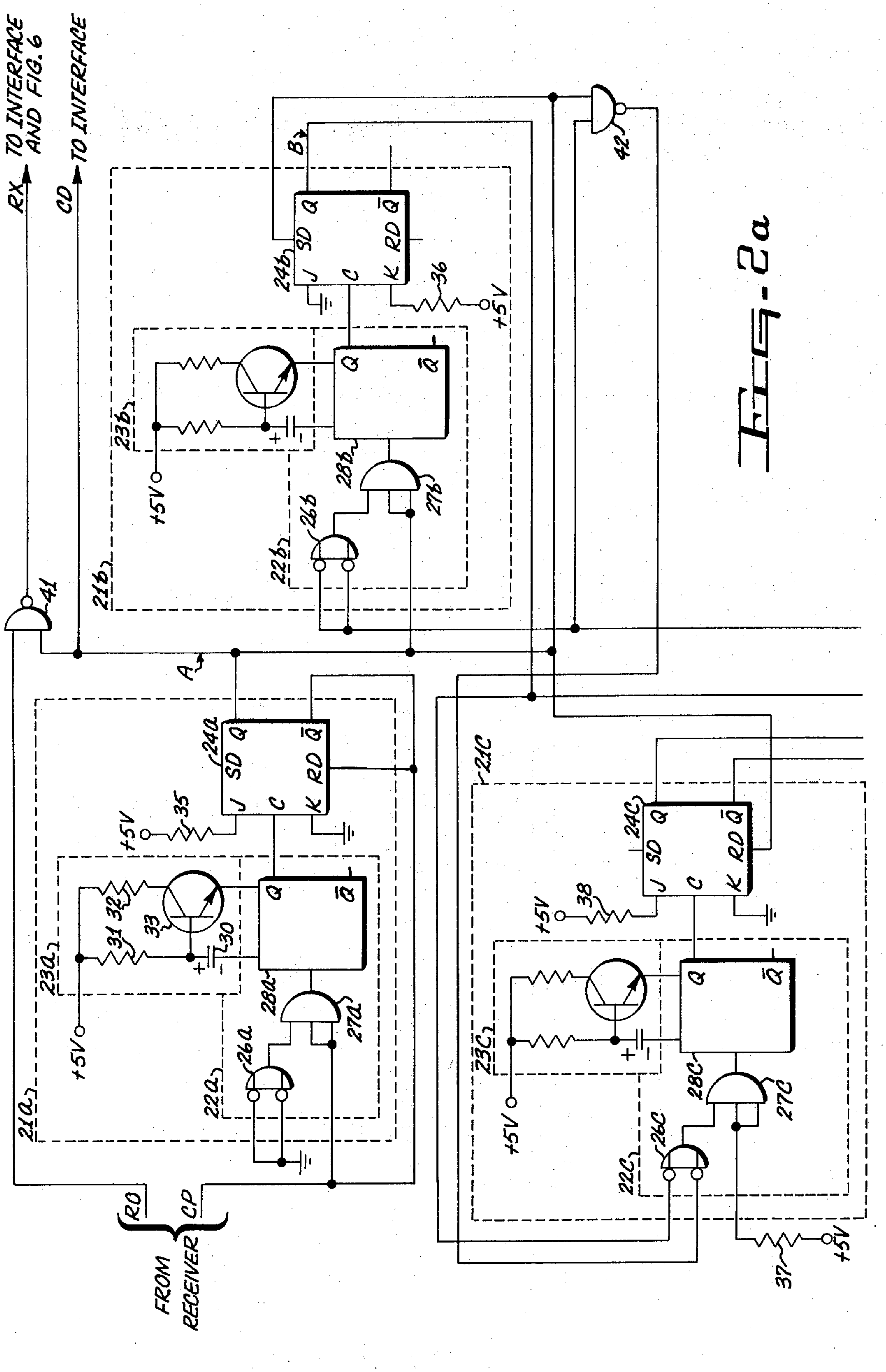
FIGS. 2*a* and 2*b* show a diagram of the modem control in accordance with the teaching of the present invention.
Figure 2B:
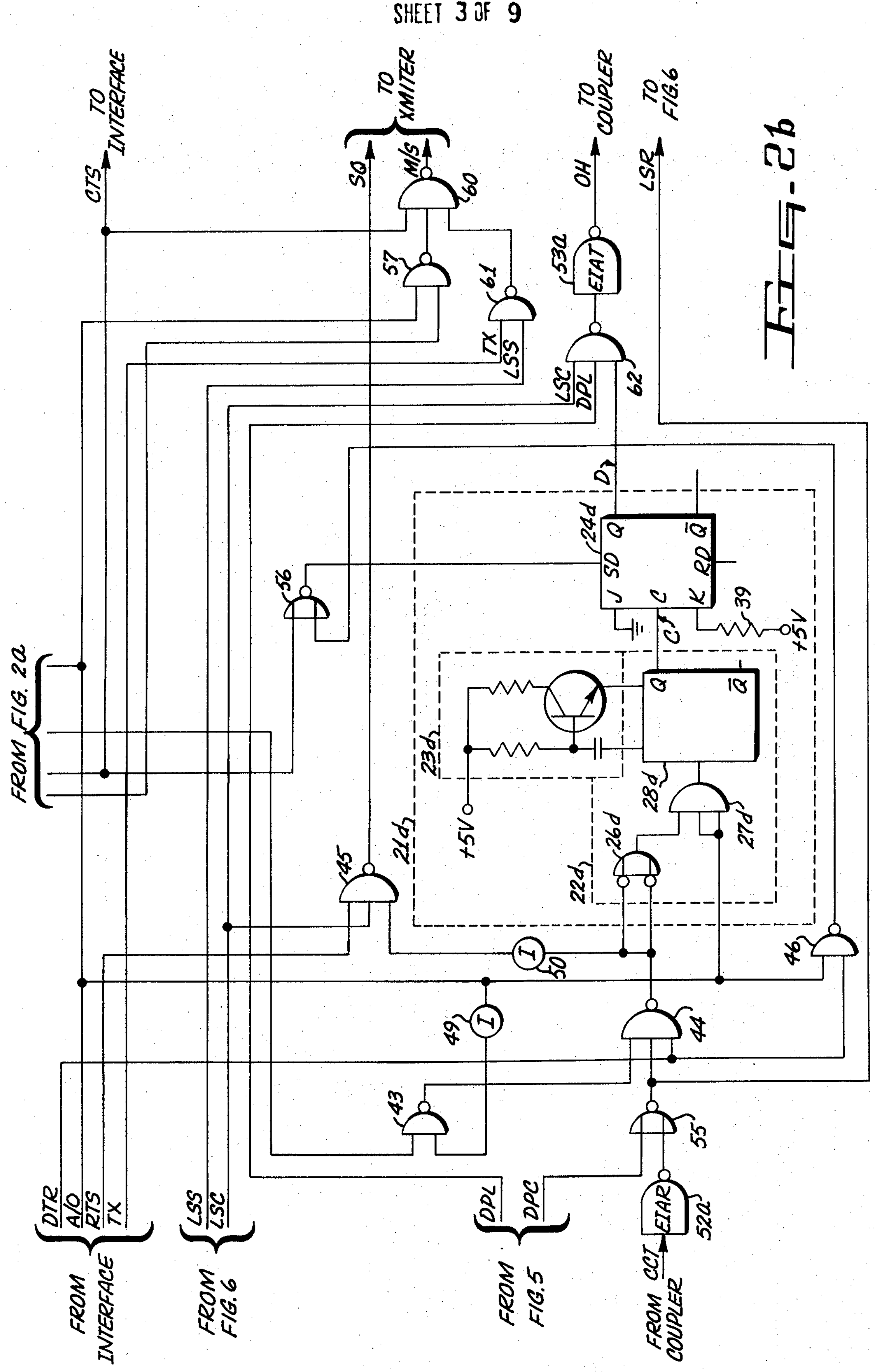

FIGS. 2*a* and 2*b* disclose a modem control which includes a plurality of gates, EIA receivers, EIA transmitters and basic timers. Each of the timers 21*a*–21*d* includes a retriggerable one-shot 22, a timing circuit 23 and a master-slave flip-flop 24. One such retriggerable one-shot which may be used is the 9601 manufactured by Fairchild and described in the booklet "Fairchile TTL Family." Each of the retriggerable one-shots 22 includes a NOR-gate 26, an AND-gate 27 and a retriggerable single-shot 28. A retriggerable single-shot is a monostable multivibrator circuit that operates in two states, one a reset state and the other a set state. It transfers from its reset state in which it normally operates to a set state upon the application of a trigger signal thereto. The lead entering the left-hand side of the single-shot shown in FIG. 2*a* provides the set input-signal. When the set input-signal goes positive the single-shot is transferred to its set state. When a single input signal is received the single-shot stays in the set state for a predetermined period of time depending upon the value of components in the timing circuit 23 and automatically returns to its reset state. Because the single-shot returns by itself to its reset state, no reset input is required. When a series of closely spaced set input signals are applied to the single-shot the single-shot transfers to its set state upon receipt of the first signal and remains in the set state for a predetermined period of time after the receipt of the last of these signals.

The AND-gates disclosed in FIGS. 2*a* and 2*b* provide a logical operation of conjunction for binary one signals applied thereto. In the system disclosed the binary one is represented by a positive signal, the AND-gate provides a positive output signal representing a binary one, when and only when, all of the input signals applied thereto are positive and represent binary ones. The symbol identified by the reference numeral 27 represents an AND-gate having three input leads. Such an AND-gate delivers a binary one output signal only when each of the input signals applied thereto are positive and represent a binary one. The NOR logic signals are developed by NOR-gates which provide the NOR logic operation for negative signals applied thereto. The NOR gate provides an output signal representing a binary one, when any one or more input signals applied thereto represent binary zeros. When all of the input signals represent binary ones, the output signal represents a binary zero. The symbol identified by reference numeral 26 represents a NOR gate having two input leads.

The NAND-gates provide the same logical operation as an AND-gate followed by an inverter. The NAND-gate provides an output signal representing a binary zero, when and only when, all of the input signals applied thereto are positive and represent binary ones. The symbol identified by the reference numeral 62 represents a NAND-gate having three input leads. Such a NAND-gate delivers a binary zero output signal only when each of the input signals applied thereto are positive and represent binary ones. When any of the input signals represent a binary zero the output signal represents a binary one. The master-slave flip-flops 24 which are shown in FIGS. 2*a* and 2*b* are commercially available from several sources. One such master-slave flip-flop which may be used is a 7473 manufactured by Fairchild and described in the booklet "Fairchild Semiconductor" by Fairchild Semiconductor Corp., Mountainview, California. Since the operation of a master-slave flip-flop is relatively well known in the art it is unnecessary to describe all of the details of the master-slave flip-flop. Even though details will be eliminated a basic description of the master-slave flip-flop will be given to enable one skilled in the art to understand the environment in which the present invention is placed. Accordingly, the operation of the flip-flop 24*a* of FIG. 2*a* will now be described.

The master-slave flip-flop 24*a* of FIG. 2*a* includes a J input lead, a K input lead, a C or clock input lead and Q and $\overline{Q}$ output leads. The master-slave flip-flop may also have a "SD" and "RD" input leads. In this type of device a one applied to the J lead and a positive voltage applied to the C lead places the flip-flop into its set state in which the binary one is stored in the flip-flop without changing the voltage on the output leads. When the voltage on the C lead decreases the binary one is transferred to the Q output lead and a binary zero to the $\overline{Q}$ lead. Conversely, when a binary one is applied to the J input lead and the positive voltage applied on the C input lead this places the flip-flop in its reset state in which a binary zero is stored in the flip-flop without changing the voltage on the output leads. When the voltage at the C input lead decreases a binary one is provided at the $\overline{Q}$ output lead and a binary zero at the Q output lead. A negative voltage applied to the SD lead of the flip-flop sets the flip-flop irrespective of the voltages applied to the J and K input leads. A negative value of voltage applied to the RD input lead resets the master-slave flip-flop irrespective of any voltages applied to the J and K input leads. A more detailed description of the master-slave flip-flop and of the timer which includes the one-shot 22*a*, the timing circuit 23a and the master-slave flip-flop 24*a* is disclosed in a co-pending application by Otto P. Weeden entitled "Solid-State Long Period Timer" filed Sept. 5, 1972.

The inverter disclosed in the circuit of FIG. 2*b* provides the logical operation of inversion for an input signal applied thereto. The inverter provides a positive output signal representing a binary one when the input signal represents a binary zero. Conversely, the inverter provides an output signal representing a binary zero when the input signal represents a binary one. The symbol identified by reference numeral 49 represents an inverter. A plurality of EIA receivers 52*a*, 52*b*, and 52*c* each convert the signal from a +15 volts to a signal having a value of zero volts and convert a −15 volts signal to a signal having a value of +5 volts. An EIA receiver which may be used is the MC1489AL manufactured by Motorola. The EIA transmitters represented by reference numerals 53*a*, and 53*b* convert a signal of zero volts to a +15 volts and converts a signal of +5 volts to a +15 volts. An EIA transmitter which may be used is the MC1488L manufactured by Motorola. The EIA receivers and transmitters are described in the booklet "Motorola Integrated Circuits for Modem and Terminal Systems," 1971, Motorola Inc., Phoenix, Arizona.

When data is to be transferred between the data processor 19 of FIG. 1 and the terminal device 16 the first step is a telephone dialing operation. The originating device dials the other device and a ringing signal is transmitted over the telephone lines to the other device. If the other device is not busy and can receive data a reply signal is transmitted to the originating device. If the reply signal is not received after a predetermined duration of time the originating device is disconnected from the telephone line. This prevents telephone lines from being tied up when the data communication system is not sending data If a reply signal is received the originating device delays for 1.5 seconds to allow special voice telephone circuits to be removed from the telephone lines; then the originating device sends a "mark hold" signal to the other device. The originating device delays 265 milliseconds and transmits a "clear to send" signal. The signals and the timing have been standardized by the telephone industry for use by prior art modems. Thus, all modems must use these standardized signals and the standardized timing to properly communicate with prior art modems which may be connected to the data communication system.

The operation of the timer 21*a* of FIG. 2*a* comprising retriggerable one-shot 22*a*, timing circuit 23*a* and master-slave flip-flop 24*a* will now be described. The input leads to the NOR-gate 26*a* of the retriggerable one-shot are connected to ground so that the output voltage from NOR-gate 26*a* is a positive voltage thereby enabling AND-gate 27*a*. When AND-gate 27*a* is enabled positive pulses applied to the CP input lead cause the retriggerable single-shot 28*a* to be set and cause the timer to provide pulses of a predetermined time duration at the Q output lead of flip-flop 24*a*. Each of the positive pulses on the CP input lead causes the timer to provide a pulse having a predetermined interval of time unless another pulse is received on the CP input lead prior to the end of the timing period.

Prior to the time that a positive pulse is applied to the CP input lead capacitor 30 in the timing circuit 23a is charged to the polarity shown in FIG. 2a. A positive pulse on the CP input lead causes AND-gate 27a to provide a positive pulse to the single-shot 28a. This positive pulse sets single-shot 28a thereby causing the single-shot to discharge capacitor 30 and causing single-shot 28 to provide a positive pulse on the Q output lead. The positive pulse from the Q output lead of single-shot 28 and the positive voltage applied to the J input lead cause the master-slave flip-flop 24a to be set. When capacitor 30 discharges the single-shot no longer provides a path for the capacitor to discharge. A current now flows from the +5 volt source through resistor 31 to the upper plate of capacitor 30 causing capacitor 30 to charge. Capacitor 30 continues to charge until the voltage on the upper plate of the capacitor reaches a predetermined value. When the voltage on the capacitor reaches a predetermined value this voltage causes the retriggerable single-shot 28a to be reset so that the voltage on the Q output lead of the single-shot decreases to a low value. The decreasing voltage on the Q output lead of the single-shot is coupled to the C input lead of the master-slave flip-flop 24a causing the flip-flop to develop a positive value of voltage on the Q output lead of flip-flop 24a. The input signal to timer 21a is shown in waveform CP of FIG. 3 and the voltage on the Q output lead of flip-flop 24a is shown in waveform A of FIG. 3. The RC time constant of resistor 31 and capacitor 30 determine the duration of the charge time of capacitor 30 and determine the time delay between applying a positive CP voltage at time $t_8$ and developing a positive voltage on the Q output lead at time $t_9$ in FIG. 3.

Figure 3:
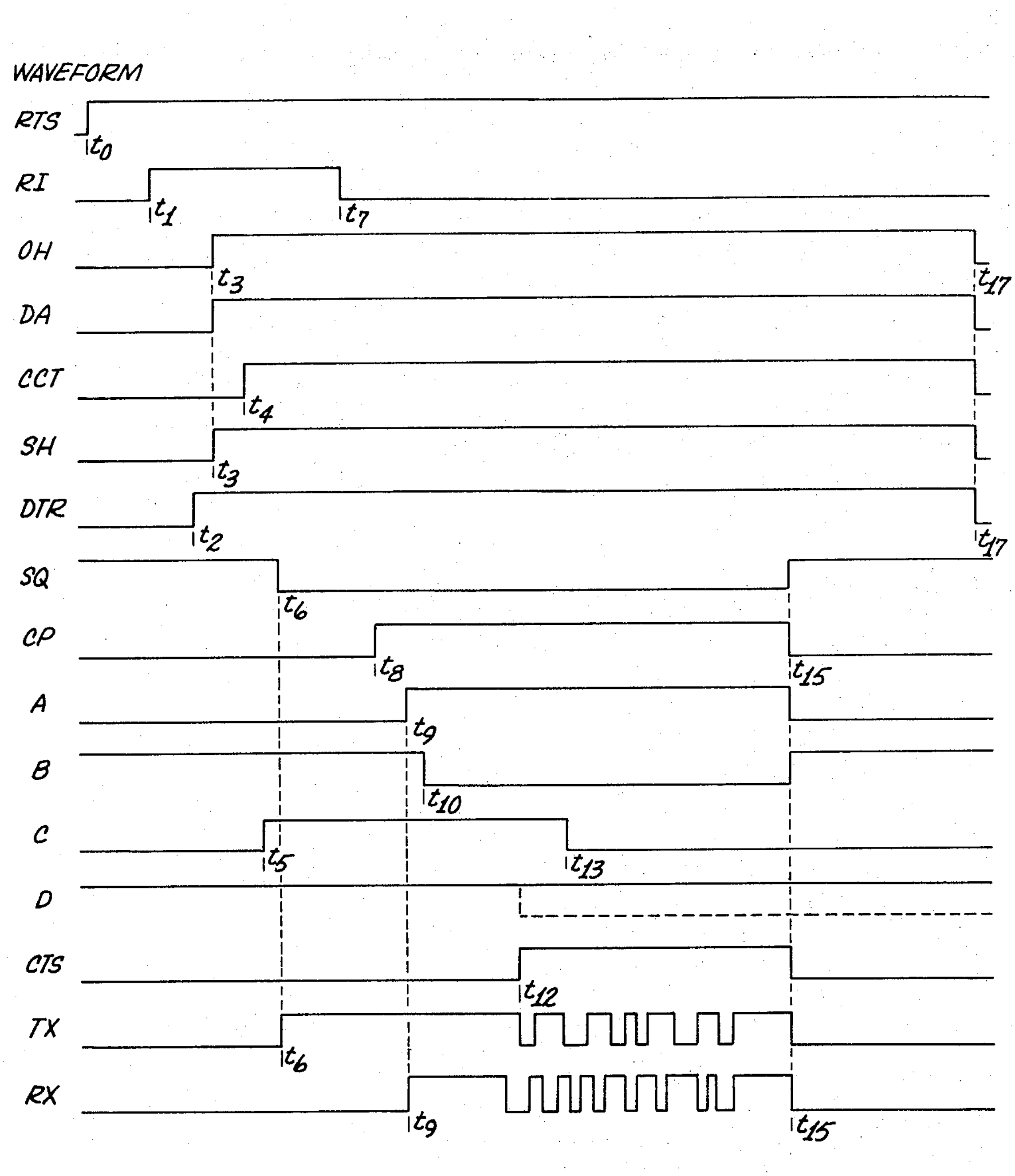
FIGS. 3 and 4 illustrate waveforms which are useful in explaining the operation of the invention shown in FIGS. 2*a* and 2*b*.

The following control line signals are used in explaining the operation of the modem control:

A/O — Answer/Originate
CP — Carrier present
CD — Carrier detect
CTS — Clear to send
DA — Data access control
DC — Dial complete
DPC — Dial pulse complete
DPL — Dial pulse line
DPN — Dial pulse number
DSP — Data set ready
DTR — Data terminal ready
LSC — Long space complete
LSR — Long space reset
LSS — Long space stop
M/S — Mark/space control
OH — Off Hook
RI — Ring Indicator
RTS — Request to send
RX — Received data
SD — Start dial
SQ — Squelch
TX — Transmitted data The operation of the modem control of FIGS. 2a and 2b will now be described in connection with the waveforms shown in FIG. 3 and the block diagram shown in FIG. 1. The waveforms of FIG. 3 are shown by corresponding letters at various locations on FIGS. 2a and 2b. FIGS. 2a and 2b are drawn to be placed side by side with the leads from the bottom of FIG. 2a connected to the leads from the top of FIG. 2b. The RTS (request to send) signal is used only during half-duplex operation when signals are sent only in one direction at a time between the terminal device and the processor. When data is transmitted in both directions in the full-duplex operation the RTS signal may be left on for continuous transmission, or it may be eliminated. The data communication system operates in either the answer mode or in the originate mode. When the system operates in the answer mode the terminal device 16 of FIG. 1 calls the data processor 9 by sending a ring signal to the processor. The processor answers the call by sending a return signal. When the system operates in the originate mode, the call originates in the processor and is answered by the terminal device. Prior to the transmission of data the data sets 12 and 15 must be placed in the data mode and an exchange of carrier tones called "channel establishment" performed.

Figure 5:
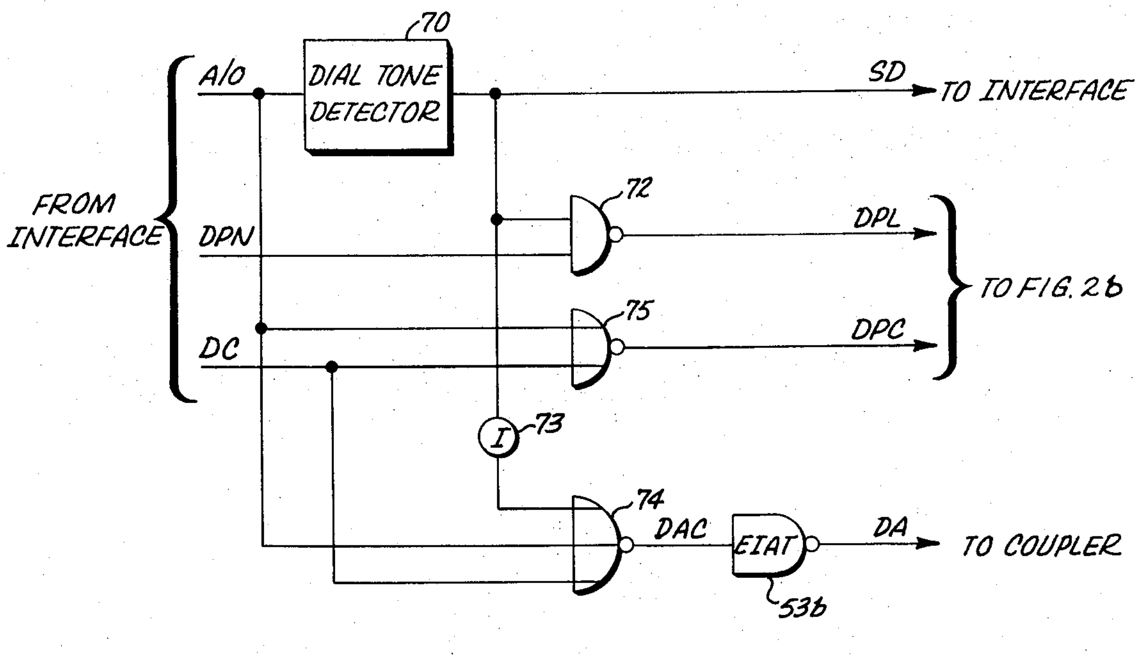
FIG. 5 is a block diagram of the originate dial pulse option which may be used in the modem control.
Figure 6:
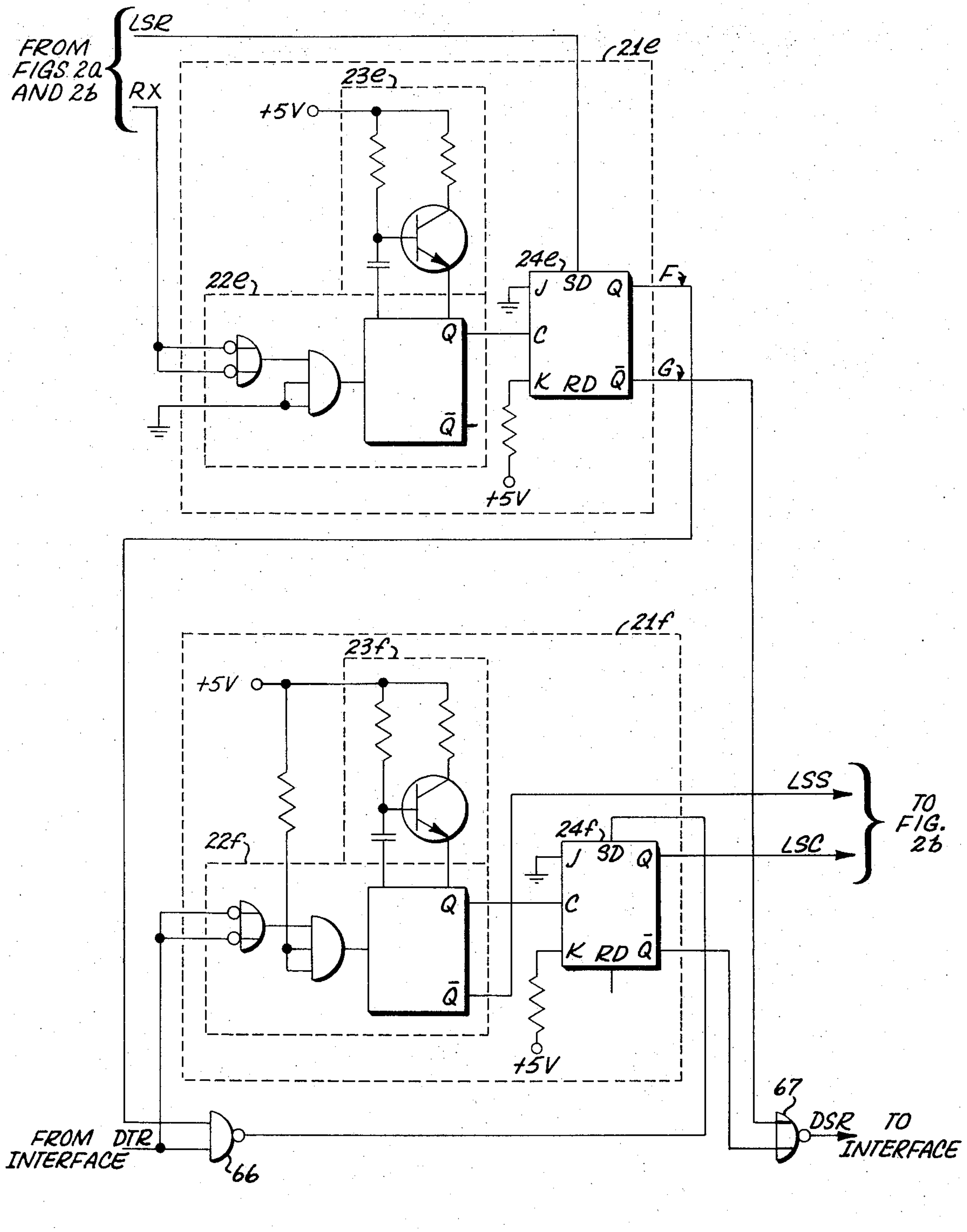
FIG. 6 is a block diagram of the long-space disconnect option which may be used in the modem control.
Figure 7:
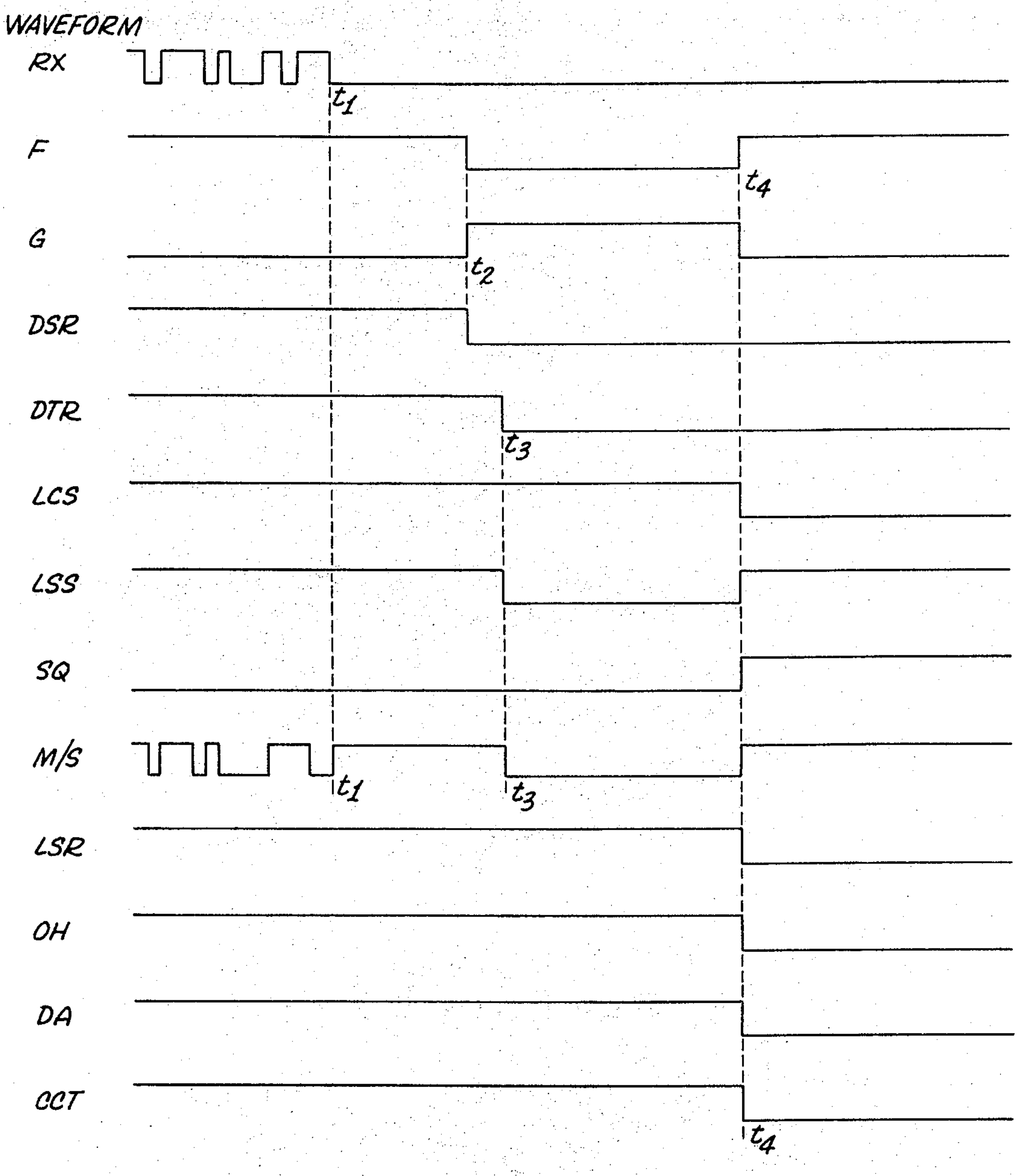
FIG. 7 illustrates waveforms which are useful in explaining the operation of the long-space disconnect option shown in FIG. 6.

When the data communication system is in the answer mode the LSC signal, the DPC signal, the LSS signal, the CD signal, the RTS signal, the dial pulse logic of FIG. 5 and the long-space logic of FIG. 6 are not used. When the dial pulse logic and long-space logic of FIGS. 5 and 6 are not used the LSC and DPL leads of gates 45 and 62 are connected to the DTR lead from the data terminal interface. With the modem in the answer mode and in the idle condition it waits for an incoming call. When the CBS coupler receives a ring signal from the terminal device it develops a positive RI (ring indicator) signal which is coupled to EIA receiver 52C in the modem control at time $t_1$ of FIG. 3. EIA receiver 52C transposes the levels of the signal and sends an RI signal to the interface. The data terminal interface recognizes the RI signal as an incoming call and develops a positive DTR (data terminal ready) signal and a positive A/O (answer/origniate) signal at time $t_2$. The positive A/O signal is coupled to NOR-gate 26b of timer 21b causing gate 26b to provide a negative signal to the upper lead of AND-gate 27b. The negative signal to gate 27b disables the 1.5 second timer 21b. The 1.5 second timer 21b is not needed by telephone equipment when the data communications equipment is operating in the answer mode. When the 12 second abort timer is not required timers 21a and 21c are the only timers used in a data communication system having an "answer only" type of operation. At time $t_2$ the low value of voltage at the Q output lead of flip-flop 24a causes NAND-gate 42 to provide a positive signal to NOR-gate 26c of timer 21c. This positive signal causes gate 60 to provide a positive M/S signal to the transmitter 20 of FIG. 1 and causes transmitter 20 to transmit a carrier tone or "mark signal" when the SQ (squelch) signal to the transmitter 20 decreases at time $t_6$ of FIG. 3.

The positive DTR signal and the positive A/O signal applied to NAND-gate 46 of FIG. 2b cause gate 46 to provide a negative signal to NOR-gate 56 of FIG. 2b. This negative signal causes NOR-gate 56 to provide a positive signal to the SD input lead of flip-flop 24d so tha flip-flop 24d is no longer held in a set state. The positive DTR signal and the positive signal from flip-flop 24d cause NAND-gate 62 to provide a signal to the EIA transmitter 53a. Transmitter 53a provides a positive OH signal to the CBS coupler at time $t_3$. The coupler in turn provides a positive SH signal to EIA receiver 52b which couples a SHA signal to the interface 11 of FIG. 1. At time $t_4$ the coupler provides a positive CCT signal which is coupled to the input of EIA receiver 52a of FIG. 2b causing receiver 52a to provide a negative signal to NOR-gate 55. The negative signal causes NOR-gate 55 to provide a positive signal to the input lead of NAND-gate 44. The positive signal causes gate 44 to provide a negative signal to the input leads of NOR-gate 26d in the one-shot 22*d*, thereby causing gate 26*d* to enable the AND-gate 27*d* and start the 12 second abort timer 21*d*. AND-gate 27*d* provides a signal which causes the single-shot 28*d* to provide a positive output as shown in waveform C of FIG. 3 at time $t_5$. The signal from the output lead of NAND-gate 44 is inverted by inverter 50 and applied to NAND-gate 45 thereby causing NAND-gate 45 to provide a negative SQ signal to the transmitter 20 of FIG. 1. The negative SQ signal causes transmitter 20 to provide a mark signal which is transmitted over lines DT and DR to the CBS coupler 13.

The modem control now waits for the CP signal from the receiver to turn on. When a mark signal is received by the receiver the CP is turned on or becomes positive and enables the RD input lead of flip-flop 24*a*. The CP signal starts the 150 millisecond timer 22*a* which includes the one-shot 22*a* and timing circuit 23*a*. When 150 milliseconds has lapsed point A becomes positive and enables NAND-gate 41 so that the RO signals from the receiver cause NAND-gate 41 to provide a positive voltage at the RX output lead. The voltage from the Q output lead of master-slave flip-flop 24a also starts a 265 millisecond timer 22*c*. At the completion of the 265 milliseconds the CTS signal at the Q output lead of flip-flop 24*c* becomes positive. The positive signal from flip-flop 24*c* is coupled to NOR-gate 56 causing gate 56 to provide a negative signal to the SD input of flip-flop 24*d*. This negative signal sets flip-flop 24*d* so that the voltage at the Q output lead of flip-flop 24*d* remains high and the voltage on the OH output lead of the EIA transmitter 53*a* remains positive. The positive OH signal causes the data terminal equipment to send data through the CBS coupler, the modem control and the data terminal interface and to the computer.

If the CTS signal does not go positive before the 12 second timer has completed a 12 second time interval, the voltage at the Q output lead of flip-flop 24*d* decreases so that the signals OH, DA and SH decrease. When the SH signal decreases the data terminal equipment turns off the DTR signal. This establishes an "on hook" condition and the modem is now in its idle state.

When the carrier is no longer received by receiver 18 of FIG. 1 the CP voltage decreases causing flip-flop 24*a* to reset so that the voltage at the Q output lead of flip-flop 24*a* of FIG. 2 decreases as shown at time $t_{15}$ in waveform A of FIG. 3. When the voltage at the Q output of flip-flop 24*a* decreases this causes the one-shot 22*b* to set and provide a positive voltage on the Q output lead as shown at time $t_{15}$ in waveform B of FIG. 3. The decreased voltage from the Q output lead of flip-flop 24*a* also causes the master-slave flip-flop 24c to reset so that the CTS voltage from the Q output lead of flip-flop 24*c* decreases at time $t_{15}$ of FIG. 3. This decrease in the CTS (clear to send) signal causes the data set 15 of FIG. 1 to be disconnected from data set 12.

Figure 4:
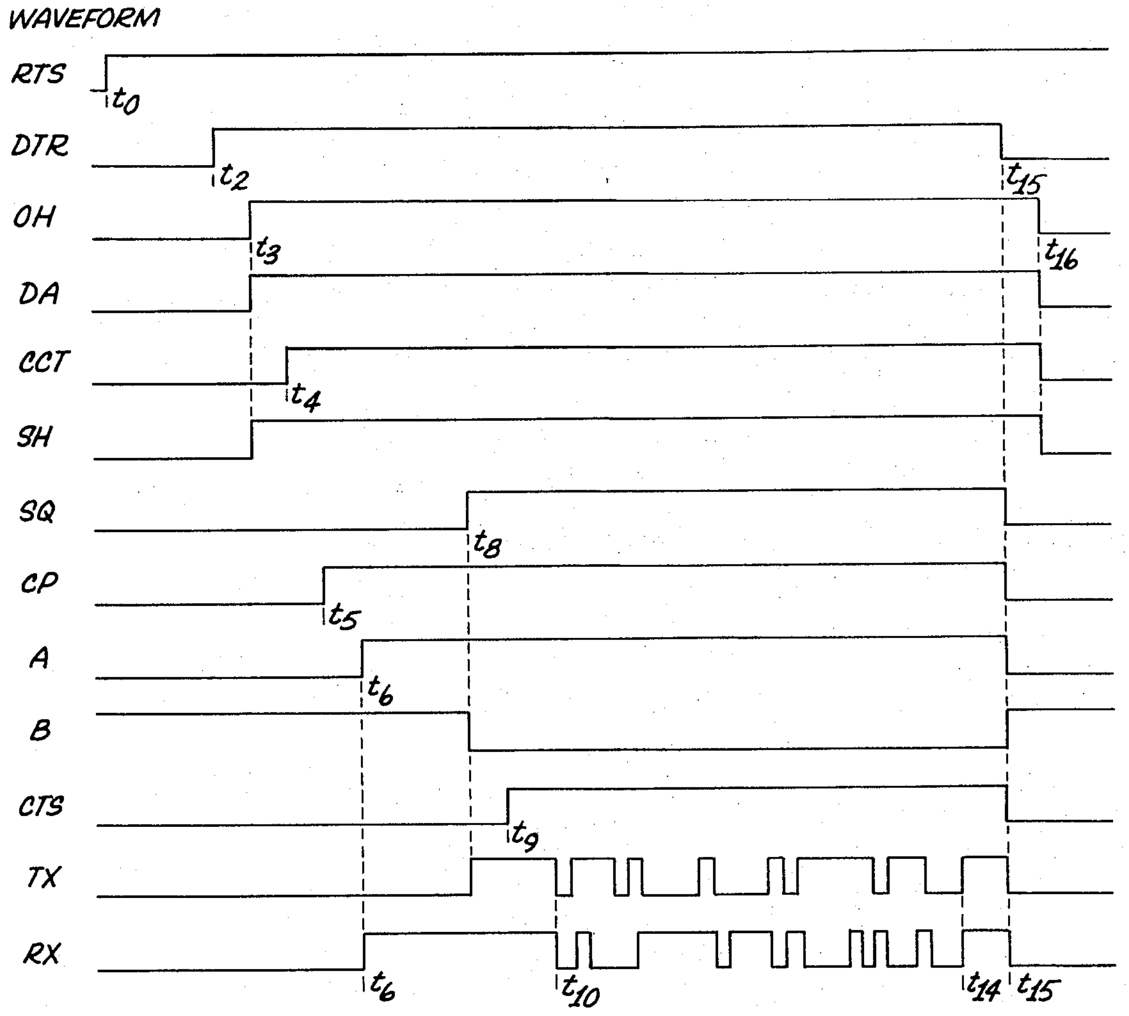

The originate mode of operation of the modem control of FIGS. 2*a* and 2*b* will now be discussed in connection with the waveform shown in FIG. 4. This explanation may be simplified by assuming that we start from the idle state and further assuming the prior conditions established in the answer mode discussed above. The sequence of calling a terminal device and receiving an answer of mark signal is known as the handshaking sequence. The signal on the A/O input from the interface has a low value when the data communication system shown in FIG. 1 is in the originate mode. The DTR signal is applied to the lower leads of NAND-gates 44 and 46 to enable these gates. When a telephone number has been called by the computer and the call has been answered the SH, OH, DA and CCT signals are positive. The computer then waits for an incoming mark signal. When a mark signal has been detected by the receiver 18 of FIG. 1 the CP signal becomes positive as shown at time $t_5$ of FIG. 4. The CP positive signal starts the 150 millisecond timer 21*a* so that voltage A becomes positive after 150 milliseconds thereby supplying a positive CD signal to the interface. The positive voltage from the Q output of timer 21*a* starts the 1.5 second timer 21*b*. At the end of 1.5 seconds the voltage on the Q output lead of the flip-flop 24*b* decreases at time $t_8$. This low value of signal is coupled through NAND-gates 43 and 44 and inverted by inverter 50 thereby causing the SQ signal to have a low value. When the SQ or squelch signal is low the transmitter 20 sends a mark signal to the CBS coupler.

The signal from the 1.5 second timer 21*b* also starts timing in the 265 millisecond timer 21*c*. When the 265 millisecond time has lapsed the CTS signal from flip-flop 24*c* is positive. The positive CTS signal causes NOR-gate 56 to provide a negative signal which sets flip-flop 24*d* and stops the timing of the 12 second timer 21*d*. Flip-flop 24*d* provides a positive signal OH through gate 62 and EIA transmitter to the coupler 13 of FIG. 1. The CTS signal is also coupled to the upper lead of NAND-gate 60 causing gate 60 to develop a M/S signal which turns control of the transmitter to the data terminal interface. Data transmissions can now be sent from the interface through the coupler, over the telephone lines to the terminal device 16 shown in FIG. 1. At the completion of the data transmission the DTR signal decreases or is turned off which causes the SQ, OH, DA, CCT and SH signals to be turned off. The modem is now in its idle state.

FIGS. 5 and 6 illustrate two optional circuits which may be added to the modem control of FIG. 2. FIG. 5 illustrates the dial pulse circuit and FIG. 6 illustrates the long space disconnection circuit. The DPL leads, the DAC lead and the DPC lead of FIG. 5 may be connected to the corresponding leads shown in FIG. 2*a* and 2*b*. The RX lead, the LSR lead and the LSC lead shown in FIG. 6 may be connected to the corresponding leads shown in FIGS. 2*a* and 2*b*. A dial tone generator 70 such as the Tone Decoder Phase Locked Loop No. 567 may be used in the circuit of FIG. 5. This tone generator may be purchased from a manufacturer such as the Signetic Corporation. The generator or tone decoder is described in the "Signetics Linear Catalog" by Signetics Corporation, Sunnyvale, California, 1972, on page 229.

Figure 8:
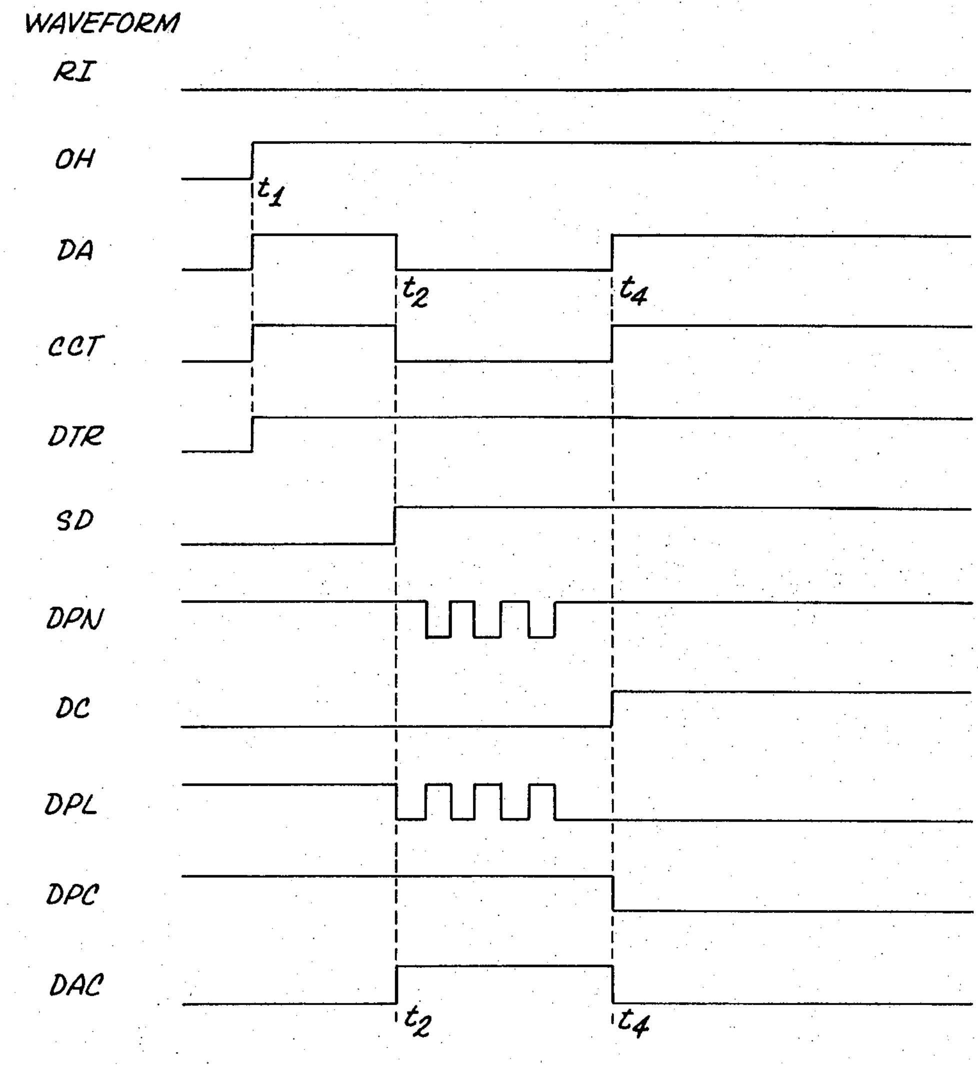
FIG. 8 illustrates waveforms which are useful in explaining the operation of the originate dial pulse operation circuit shown in FIG. 5.

The operation of the dial pulse circuit shown in FIG. 5 will now be discussed in connection with the waveform shown in FIG. 8. When the data communication system shown in FIG. 1 is in an idle condition and a call is to be initiated the DTR signal is turned on to a positive value. This turns on the OH signal, the SH signal, the CCT and the DA signals. With the A/O signal in the off condition for the originate mode the tone detector 70 is enabled so that it provides an SD or start dial signal to the interface 11 when a dial tone is detected. The SD signal informs the interface that a dial pulse number can now be sent to the DPN lead shown in FIG. 5. The SD signal also enables the NAND-gate 72 of FIG. 5 so that the dialing signal DPN (dial pulse number) from the interface is gated to gate 72 to the DPL lead which is connected to the NAND-gate 62 of FIG. 2a. The DPL signal is gated through gate 62 and the EIA transmitter 53b to the coupler as the OH signal. This OH signal causes the desired data terminal to be dialed over the telephone lines. After the number has been dialed the data terminal interface 11 provides the DC signal to the dial circuit of FIG. 5 thereby causing the DPC and the DA signals to turn off. When the DAC signal is turned off this is coupled through the EIA transmitter 53*b* to the coupler which causes the CCT signal to turn on and to start the normal handshaking sequence which was discussed in the originate mode using FIGS. 2*a*, 2*b* and 4.

During the time that the normal data transmission is taking place the received data RX is being monitored for a long space condition by the circuit shown in FIG. 6. If at any time during the reception of data the RX voltage of FIG. 2*a* decreases the 1.5 second timer 21*e* of FIG. 6 will turn the point G on which will cause the DSR signal to be turned off. When DSR is turned off the data terminal interface turns off the DTR signal. When DTR is turned off this provides a signal to the two second timer 21*f* which starts the timer. After 2 seconds the timer 21*f* provides a low value voltage on the LSS signal causing the LSS signal of FIG. 2*b* to turn off and causing the transmitter 20 of FIG. 1 to send a space signal for 2 seconds. When the 2 second period has ended the LSC signal will turn off and this causes the OH, the DA, the SH, the SQ, and the CCT signal to turn off. If the modem is in the originate mode or if at any time the data terminal interface turns off DTR the 2 second timer starts and the 2 second space signal will be transmitted prior to the shutdown of the modem.

While the principles of the invention have now been made clear in an illustrative embodiment, there will be many obvious modifications of the structure, proportions, materials and components without departing from those principles. The appended claims are intended to cover any such modifications.

What is claimed is:

1. A modem control for use with a computer interface, a CBS coupler, a data set receiver and a data set transmitter, said control comprising:

first and second timers each having first, second and third input leads, a set input lead, a reset input lead and first and second output leads;

first and second reference potentials, said first and said second signal input leads of said first timer being connected to said second potential, said third signal input lead and said reset input lead of said first timer each being coupled to said receiver, said first output lead of said first timer being coupled to said second input lead of said second timer and to said interface, said first output lead of said first timer being connected to said reset input lead of said second timer, said third signal input lead of said second timer being coupled to said first potential; and first gating means having an output lead and first, second and third input leads, said output lead of said first gating means being connected to said transmitter, first input lead of said first gating means being coupled to said first output lead of said second timer, said second input lead of said first gating means being coupled to said second output lead of said second timer, said third input lead of said first gating means being coupled to said interface.

2. A modem control as defined in claim 1 wherein each of said timers includes:

a retriggerable one-shot having first, second and third input leads and an output lead, each of said input leads of said one-shot being connected to a corresponding one of said signal input leads of said timer;

a timing circuit, said timing circuit being connected to said one-shot; and a master-slave flip-flop having a signal input lead, a set lead, a reset lead and first and second output leads, said input lead of said flip-flop being connected to said output lead of said one-shot, said first and said second output leads of said flip-flop each being connected to a corresponding one of said output leads of said timer, said set lead of said flip-flop being connected to said set input lead of said timer, said reset lead of said flip-flop being connected to said reset input lead of said timer.

3. A modem control as defined in claim 1 including:

a fourth timer having first, second and third signal input leads, a set input lead, a reset input lead and first and second output leads;

means for coupling said first and said second input leads of said fourth timer to said interface and to said coupler, said third input lead of said fourth timer being connected to said interface; and means for coupling said set input lead of said fourth timer to said first output lead of said second timer and to said interface, said first output lead of said fourth timer being connected to said coupler.

4. A modem control for use with a computer interface, a CBS coupler, a data set receiver and a data set transmitter, said control comprising:

first, second and third timers each having first and second input leads, a said input lead, a reset input lead and first and second output leads;

first and second reference potentials;

said first and said second signal input leads of said first timer being connected to said first potential, said third signal lead and said reset input lead of said first timer each being coupled to said receiver, said first output lead of said first timer being coupled to said third signal input lead of said third timer and to said set input lead of said third timer, said first output leads of said first and said second timers each being coupled to said interface, said first and said second signal input leads of said third timer each being connected to said interface;

means for coupling said second signal input lead of said second timer of said interface and to said first output lead of said first timer, said first output lead of said third timer being connected to said first signal input lead of said second timer, said third signal input lead of said second timer being coupled to said first potential, said reset input lead of said second timer being connected to said first output lead of said first timer; and first gating means having an output lead and a plurality of input leads, said output lead of said first gating means being connected to said transmitter, said input leads of said first gating means being coupled to said first interface and to said first and said second output leads of said second timer.

5. A modem control for use with a computer interface, a CBS coupler, a data set receiver and a data set transmitter, said control comprising:

first, second, third and fourth timers each having first, second and third signal input leads, a set input lead, a reset input lead and first and second output leads;

first and second reference potentials, said first and said second signal input leads of said first timer being connected to said second potential, said third signal input lead and said reset input lead of said first timer each being coupled to said receiver, said first output lead of said first timer being coupled to said third signal input lead of said third timer and to said input lead of said third timer, said first output leads of said first and said second timers each being coupled to said interface, said first and said second signal input leads of said third timer each being connected to said interface;

means for coupling said second signal input of said second timer to said interface and to said first output lead of said first timer, said first output lead of said third timer being connected to said first signal input lead of said second timer, said third signal input lead of said second timer being coupled to said first potential, said reset input lead of said second timer being connected to said first output lead of said first timer;

means for coupling said first and said second signal input leads of said fourth timer to said interface and to said coupler, said third signal input lead of said fourth timer being connected to said interface;

means for coupling said set input lead of said fourth timer to said first output lead of said second timer and to said interface; and first gating means having an output lead and a plurality of input leads, said output lead of said first gating means being connected to said transmitter, said input leads of said first gating means being coupled to said interface and to said first and said second output leads of said second timer, said first output lead of said fourth timer being connected to said coupler.

6. A modem control as defined in claim 5 wherein each of said timers includes:

a retriggerable one-shot having first, second and third input leads and an output lead, each of said input leads of said one-shot being connected to a corresponding one of said signal input leads of said timer;

a timing circuit, said timing circuit being connected to said one-shot; and a master-slave flip-flop having a signal input lead, a set lead, a reset lead and first and second output leads, said input lead of said flip-flop being connected to said output lead of said one-shot, said first and said second output leads of said flip-flop each being connected to a corresponding one of said output leads of said timer, said set lead of said flip-flop being connected to said set input lead of said timer, said reset lead of said flip-flop being connected to said reset input lead of said timer.

7. A modem control as defined in claim 5 including:

fifth and sixth timers each having first, second and third signal input leads, a set input lead and first and second output leads, said sixth timer having a third output lead, said first and said second signal input leads of said fifth timer being coupled to said receiver, said third signal input lead of said fifth timer being connected to said second potential, said set input lead of said fifth timer being coupled to said coupler, said third signal input lead of said sixth timer being connected to said second potential said first and said second signal input leads of said sixth timer being connected to said interface, said third signal input lead of said sixth timer being connected to said first potential, said first output lead of said sixth timer being connected to said coupler; and first, second and third gating means each having first and second input leads and an output lead, said first input lead of said first gating means being connected to said first output lead of said fifth timer, said second input lead of said first gating means being connected to said interface, said output lead of said first gating means being connected to said set input lead of said sixth timer, said first input lead of said second gating means being connected to said second output lead of said fifth timer, said second input lead of said second gating means being connected to said second output lead of said sixth timer, said output lead of said second gating means being connected to said interface, said first input lead of said third gating means being connected to said interface, said output lead of said third gating means being coupled to said transmitter, said second input lead of said third gating means being connected to said third output lead of said sixth timer.

8. A modem control as defined in claim 5 including:

first and second logic gates each having first and second input leads and an output lead;

a third logic gate having first, second and third input leads and an output lead, said first input leads of said first, said second and said third logic gates each being coupled to said interface, said second input leads of said second and said third logic gates each being coupled to said interface, said output leads of said first and said third logic gates each being coupled to said coupler, said output lead of said second logic gate being coupled to said first and said second signal input leads of said fourth timer; and a dial tone detector having an input lead and an output lead, said input lead of said detector being connected to said interface, said output lead of said detector being coupled to said interface, to said second input lead of said first logic gate and to said third input lead of said third logic gate.

9. A modem control as defined in claim 5 including:

fifth and sixth timers each having first, second and third signal input leads, a set input lead and first and second output leads, said sixth timer having a third output lead, said first and said second signal input leads of said fifth timer being coupled to said receiver, said third signal input lead of said fifth timer being connected to said second potential, said set input lead of said fifth timer being coupled to said coupler, said third signal input lead of said sixth timer being connected to said second potential, said first and said second signal input leads of said sixth timer being connected to said interface, said third signal input lead of said sixth timer being connected to said first potential, said first output lead of said sixth timer being connected to said coupler;

first, second and third gating means each having first and second input leads and an output lead, said first input lead of said first gating means being connected to said first output lead of said fifth timer, said second input lead of said first gating means being connected to said interface, said output lead of said first gating means being connected to said set input lead of said sixth timer, said first input lead of said second gating means being connected to said second output lead of said fifth timer, said second input lead of said second gating means being connected to said second output lead of said sixth timer, said output lead of said second gating means being connected to said interface, said first input lead of said third gating means being connected to said interface, said output lead of said third gating means being coupled to said transmitter, said second input lead of said third gating means being connected to said third output lead of said sixth timer;

first and second logic gates each having first and second input leads and an output lead;

a third logic gate having first, second and third input leads and an output lead, said first input leads of said first, said second and said third logic gates each being coupled to said interface, said second input leads of said second and said third logic gates each being coupled to said interface, said output leads of said first and said third logic gates each being coupled to said coupler, said output lead of said second logic gate being coupled to said first and said second signal input leads of said fourth timer; and a dial tone detector having an input lead and an output lead, said input lead of said detector being connected to said interface, said output lead of said detector being coupled to said interface, to said second input lead of said first logic gate and to said third input lead of said third logic gate.

* * * * *